Nov. 9, 1937.  I. E. McCABE  2,098,397

ELECTRICAL CONTROL

Original Filed March 20, 1933  5 Sheets-Sheet 1

INVENTOR.
IRA E. McCABE

BY Laugan Moon

ATTORNEY.

Nov. 9, 1937.  I. E. McCABE  2,098,397
ELECTRICAL CONTROL
Original Filed March 20, 1933  5 Sheets—Sheet 2
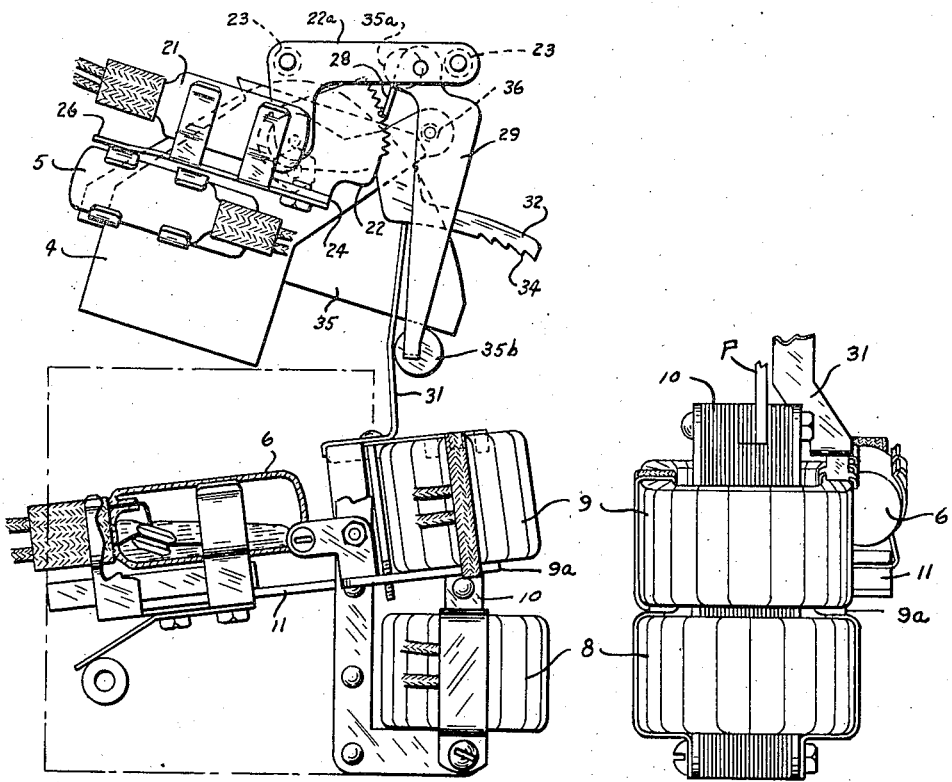
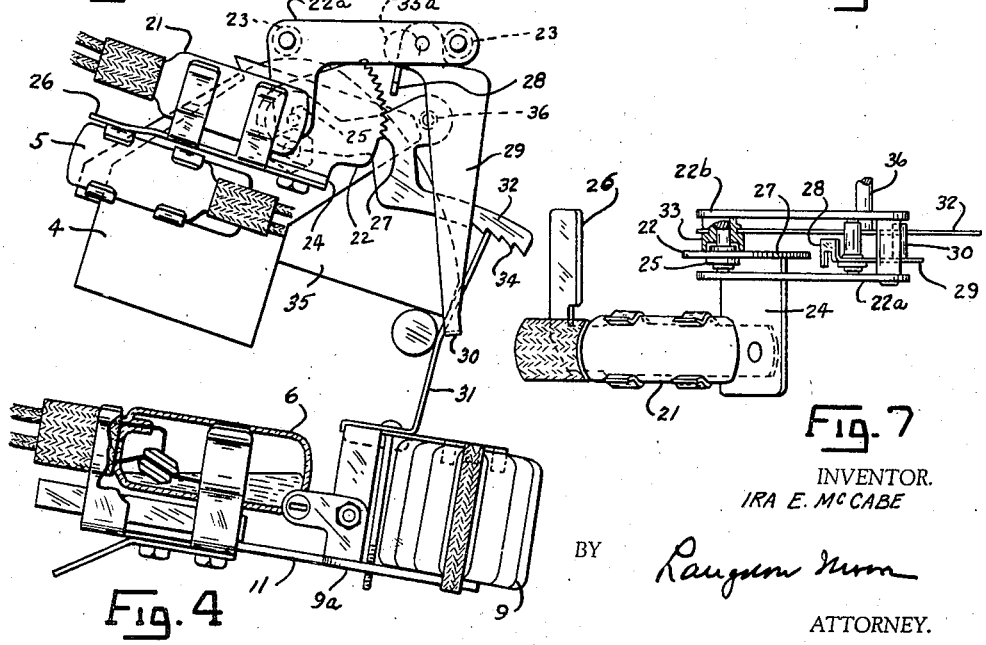
INVENTOR.
IRA E. McCABE
BY Langdon Moore
ATTORNEY.

Nov. 9, 1937.   I. E. McCABE   2,098,397
ELECTRICAL CONTROL
Original Filed March 20, 1933   5 Sheets-Sheet 3
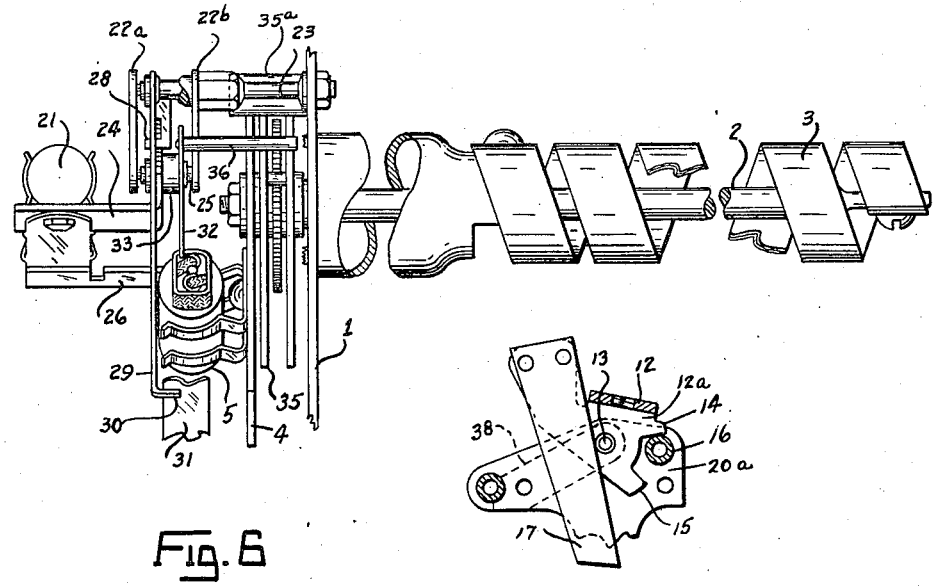
Fig. 6
Fig. 10
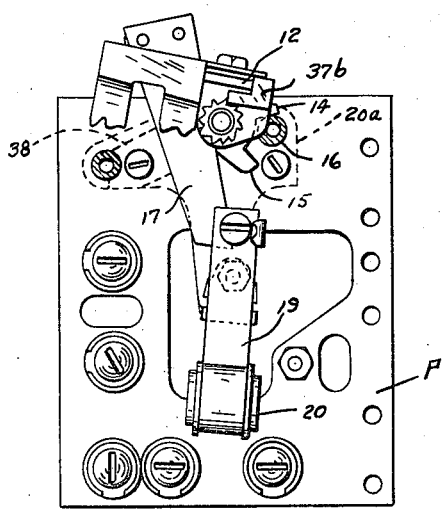
Fig. 8
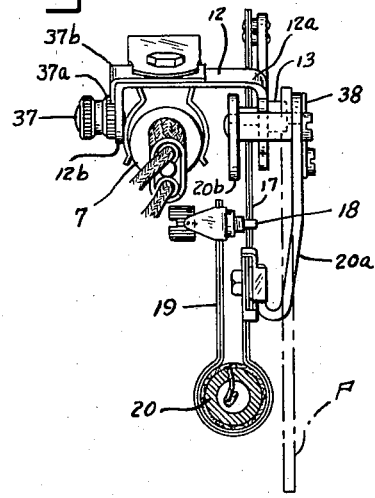
Fig. 9
INVENTOR.
IRA E. McCABE
BY
ATTORNEY.

Nov. 9, 1937. I. E. McCABE 2,098,397
ELECTRICAL CONTROL
Original Filed March 20, 1933 5 Sheets-Sheet 4
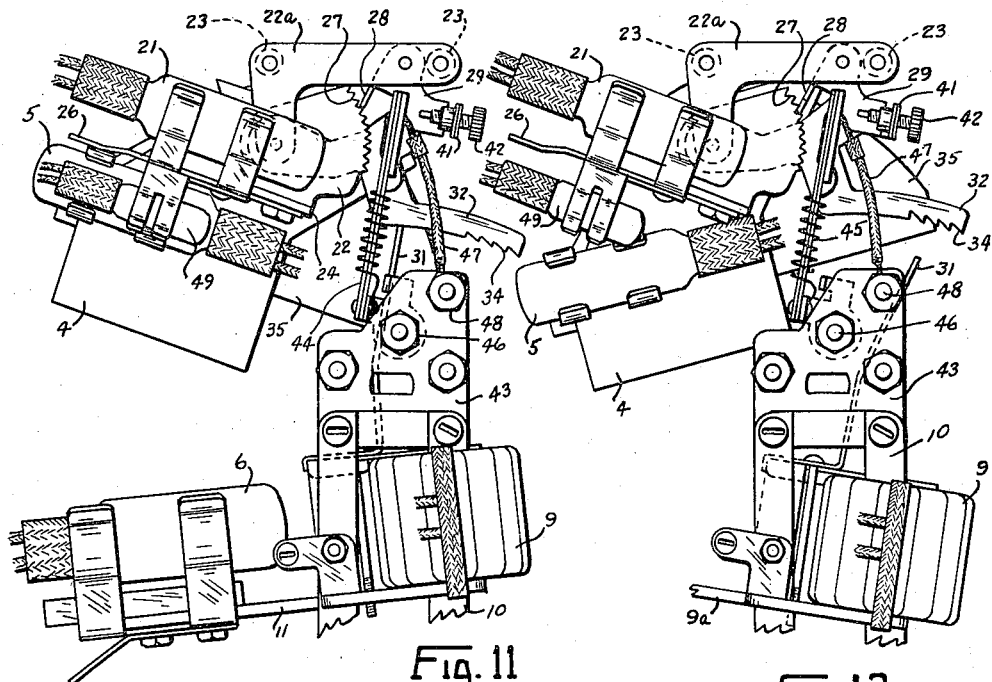
Fig. 11
Fig. 12
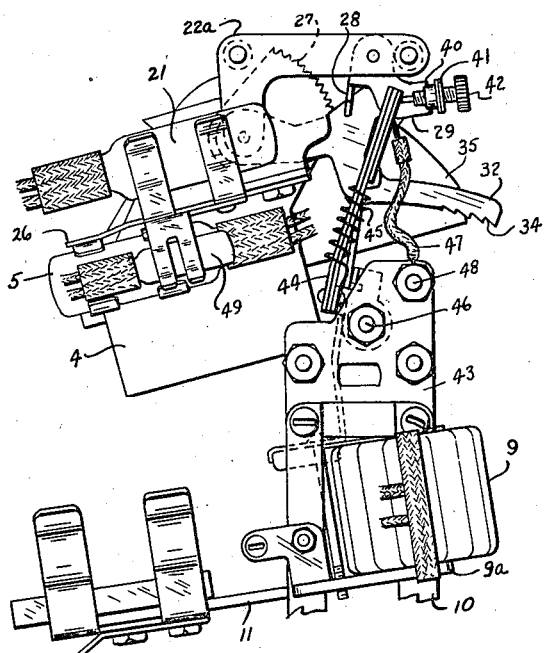
Fig. 13
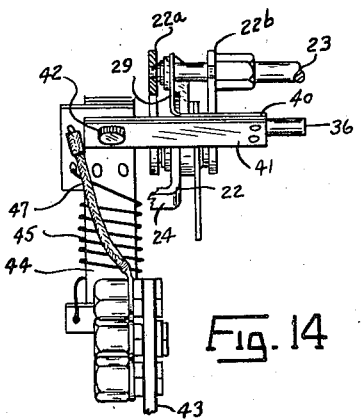
Fig. 14
INVENTOR.
IRA E. McCABE
BY
ATTORNEY.

Patented Nov. 9, 1937

2,098,397

UNITED STATES PATENT OFFICE 2,098,397

ELECTRICAL CONTROL

Ira E. McCabe, Chicago, Ill.

Original application March 20, 1933, Serial No. 661,759. Divided and this application November 11, 1935, Serial No. 49,224

6 Claims. (Cl. 158—28)

This invention relates to improvement in electrical controls and more particularly to controls of this character for use with electrically operated and controlled fluid fuel burners. This application is a division of the applicant's prior copending application Serial No. 661,759, filed March 20, 1933, now Patent No. 2,024,697, of December 17, 1935.

It is an object of this invention to combine a thermally operated safety switch mechanism and a transformer repulsion relay operated motor switch in such a manner as to insure operation of the safety switch at any and all times it may be required to operate including such times in which the relay circuit remains closed regardless of minimum line voltages.

It is a further object of this invention to produce a device of this character which provides full protection in the event of initial failure of the fuel to ignite or failure of the flame after ignition in a fluid fuel burner employing intermittent ignition and to also provide a positive ignition control which insures the closing of the ignition circuit before every starting operation.

It is another object of this invention to provide a relay of the movable coil transformer type for opening and closing the motor circuit, and employing the secondary circuit of the relay as the control circuit for controlling the operation of the burner system by including therein the room thermostat and a safety switch release mechanism. The secondary circuit thus established offers a substantially constant period for allowing the burner to go into normal running operation before causing a shut down if that time exceeds the normal time required for such operation to be obtained.

It is a still further object of this invention to provide means for manually stopping the operation of the burner and means for manually resetting the control mechanism.

With these and other objects in view, reference is made to the accompanying sheets of drawings illustrating a preferred embodiment of this invention, with the understanding that minor detail changes may be made therein without departing from the scope thereof.

Figure 3 is a similar view of said parts in the position assumed when the burner mechanism is running or in normal operation.

Figure 4 is a view similar to Figure 3 illustrating the parts in the position assumed upon a current interruption or temporary shut down.

Figure 5 is an enlarged fragmentary detailed view in end elevation of the relay shown in Figure 4.

Figure 6 is a view in end elevation, partly in section, illustrating the ignition and shunt switches and the stack safety mechanism connected therewith.

Figure 7 is a top plan view partly in section of the ignition switch as shown in Figure 6, and illustrating the operating parts thereof.

Figure 8 is a view in front elevation of the plate carrying the safety switch and operating mechanism thereof, with the switch carrying bracket broken away and the said switch removed.

Figure 9 is a view in end elevation of Figure 8 with the carrying plate indicated in dot and dash lines and the safety switch and the hand reset and stopping button shown in full lines.

Figure 10 is a fragmentary detailed view in front elevation, partly in section, of the safety switch carrying bracket.

Figure 11 is a fragmentary view in front elevation similar to Figure 3 illustrating the improvements contemplated by this invention, with the parts illustrated in the position assumed when the burner mechanism is running or in normal operation.

Figure 12 is a similar view illustrating the position of the parts assumed upon flame failure with the ignition switch locked open and the shunt switch opened by the cooling of the stack.

Figure 13 is a similar view with the ignition switch released after the flame failure.

Figure 14 is a view in end elevation of Figure 13.

Figure 2:
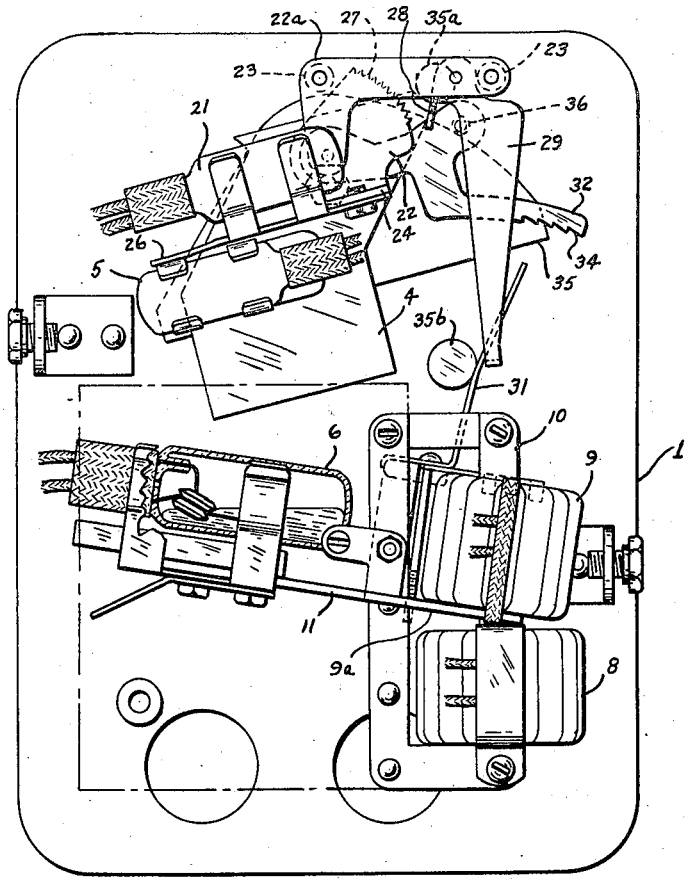
Figure 2 is a view in front elevation in this improved control with the cover removed, and also the plate and safety switch mounted thereon removed, said plate being indicated by dot and dash lines, with the parts illustrated in the cold or idle position.
Figure 1:
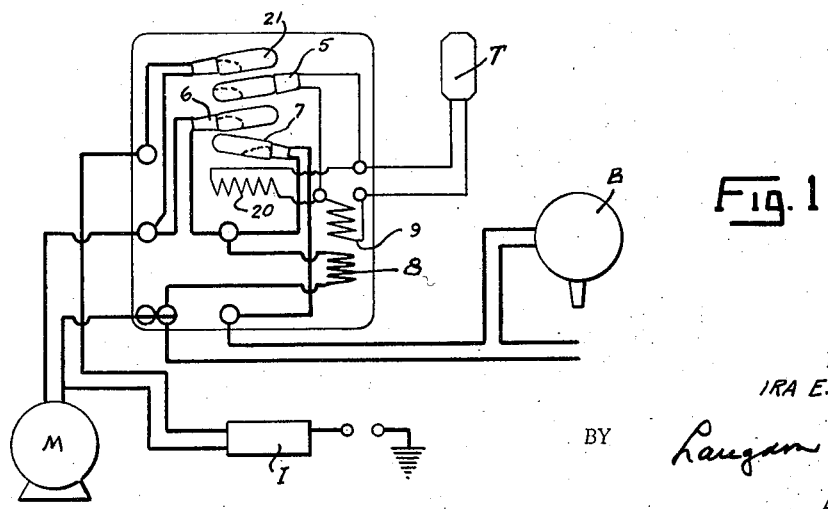
Figure 1 is a diagrammatical view illustrating the control elements of an intermittent ignition electrically operated fluid fuel burner mechanism with a wiring diagram connecting the parts thereof with the switches employed in the improved control.
Figure 15:
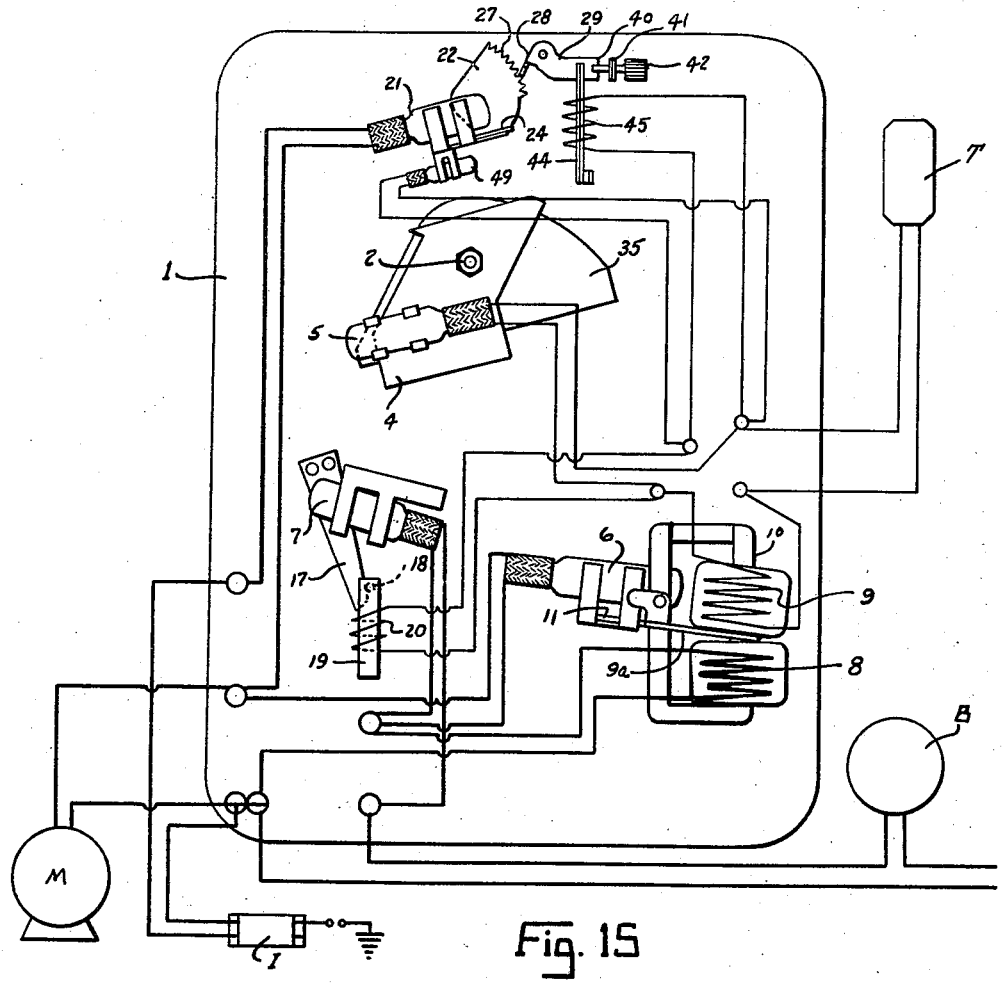
Figure 15 is a diagrammatical view of this modification with the diagram illustrating the connections of the various elements.

The control mechanism is mounted upon a panel 1 as shown in Figure 2 and includes a stack safety mechanism as disclosed in this applicant's prior Patent No. 1,762,183, dated June 10, 1930, having an actuating shaft 2 operated by the expansion of the thermal coil 3 to rotate the shunt switch carrying plate 4, as shown in Figure 6. The shunt switch 5 carried upon the plate 4 in the idle or cold position, as shown in Figure 2, is open as shown in the wiring diagram in Figure 1. The relay operated motor switch 6 is interposed in the commercial circuit between the source of electricity and the motor M. The incoming commercial circuit preferably passes through the boiler control B, of commercial construction, and a safety switch 7, hereinafter described, through the motor switch 6, when closed, through the motor M and back to the other line of the commercial circuit. The motor switch 6 is actuated by a relay of the constant current repulsion type, including a stationary primary coil 8 connected in series with the safety switch across the line and a secondary movable coil 9 connected in Series with the room thermostat T. The secondary coil 9 is wound about one vertical leg of a rectangular core 10 and is adapted to travel thereover. The motor switch 6 is mounted upon a lever 11, pivoted to one side of the rectangular core and connected by a bracket 9a (Figure 3) to the under side of the movable secondary coil 9, so that when the secondary circuit is closed through the room thermostat T, the relay is energized and the secondary coil 9 is repelled from the stationary primary coil 8 thereby closing the circuit to the motor M through the motor switch 6 and this circuit will remain closed during the normal operation of the burner, that is as long as the room thermostat T calls for heat.

The safety switch 7 is mounted preferably upon a bracket 12 rotatably carried upon a pin 13 mounted between plates 20a and 20b carried upon a base plate P, as shown in Figures 8 and 9, which base plate is secured preferably between the laminations of the rectangular core 10, as shown in Figure 5. That portion of the bracket 12 which is mounted upon the pin 13 is provided with spaced apart stops 14 and 15 adapted to engage a stud 16 when the safety switch has been rotated to opened or closed position. A depending holding arm 17 is mounted upon the bracket 12 adapted, when the switch has been rotated to its normal closed position with the stop 14 in engagement with the stud 16, to engage a pin 18 carried upon the free end of a bi-metallic thermostatic member 19 to hold the safety switch in closed position. It is preferable to construct the holding arm 17 of the same material as the arm 19, so that they will both react to atmospheric (ambient) temperature changes in the same manner without becoming disengaged. This thermostatic strip 19 is passed about a heat coil 20 and the other end secured to the plate 20a mounted upon the base plate P. The heat coil 20 is connected in series in the secondary circuit between the movable coil 9 and a room thermostat T, so that if the secondary circuit continues to pass through the said heat coil, the heat therefrom will cause the bi-metallic strip 19 to deform to carry the pin 18 out of contact with the arm 17. The safety switch 7 being mounted upon the bracket 12 with the majority of its weight upon the same side of the pivot as the arm 17 will cause the safety switch to open the circuit to the motor. The shunt switch 5 is connected across the line in the secondary circuit on opposite sides of the heating element 20 and when the burner is idle is normally in the open position, so that when the room thermostat calls for heat the secondary circuit is established through the heat coil and the establishment of the secondary circuit energizes the repulsion relay to close the motor circuit.

An ignition switch 21, normally closed when the burner is idle, is connected in series with an ignition transformer I the relay switch 6 and safety switch 7 across the commercial line, so that when the room thermostat calls for heat the secondary circuit will be energized to close the motor circuit through switches 6 and 7 and close the ignition circuit through the switch 21.

In the event that combustion occurs the thermostatic element 3 of the stack control will impart rotation to the shunt switch 5 to close the secondary circuit therethrough and shunt out the heating element 20 of the safety switch 7, whereby the motor circuit is maintained. In the event that combustion fails to occur the thermostatic element 3 remains inactive and the secondary current continues to pass through the resistance heating element 20 causing the arm 19 to deform and release the safety switch 7 to open the motor circuit, likewise, in the event of flame failure during normal operation the thermostatic element cools and returns to normal, returning the shunt switch 5 to the open position so that the heating element 20 is energized to release the safety switch 7 to open the motor circuit.

In order that the ignition switch 21 may be opened after ignition is established and locked in the open position until the room thermostat opens the secondary circuit, the ignition switch is carried upon a plate 22 pivotally mounted between spaced apart plates 22a and 22b (Figures 6 and 7) mounted upon the panel 1 by posts 23 to clear the outside of the stack safety mechanism and shunt switch 5. The ignition switch 21 is mounted upon a right angular outward extension 24 of the carrying plate 22, so that the weight of the switch is on one side of its pivot 25 and the extremity of the mounting farthest from the pivot is provided with an actuator latch 26 which extends over the shunt switch 5, whereby when the parts are in idle position, as shown in Figure 2, the shunt switch 5 is open and the ignition switch 21 will be rotated until the latch 26 rests upon the shunt switch and assumes the closed position. Then upon the establishment of combustion the stack mechanism rotates the shunt switch to closed position and the movement thereof will be imparted to the ignition switch and move it to the open position, as shown in Figure 3.

To hold the ignition switch in open position as long as the room thermostat remains closed, a portion of the carrying plate 22 is provided with a serrated arcuate portion 27 and an ignition switch latch is pivotally mounted between the plates 22a and 22b having a pawl 28 on one side of its pivot and a depending actuator arm 29 on the other side, the weight of which normally causes the pawl 28 to engage the serrations 27 at such an angle that the pawl will slide over the serrations as the ignition switch is rotated from closed to open position but, after the ignition switch is opened, will prevent movement in the opposite direction. To release the ignition switch to return to closed position when the room thermostat opens the lower end of the actuator arm 29 is provided with a foot 30 extending toward the panel 1 and the movable coil 9 of the relay is provided with a latch arm in the form of a strip 31 carried on the upper side thereof and so arranged that when the room thermostat is closed and the relay energized the movement of the upper coil will carry the latch arm 31 out of the path of the foot 30 and allow the pawl 28 to hold the ignition switch open, but as soon as the room thermostat opens and the coil 9 drops, the arm 31 will engage the foot 30 to trip the latch and release the pawl 28 to allow the ignition switch to close as the stack safety cools.

To prevent the relay upon being deenergized by any cause such as a quick manual opening and closing of the room thermostat or by an interruption in the commercial current, to open the motor switch and then again be energized to close the motor switch before the combustion chamber has cooled, a relay latch is provided to be engaged by the relay arm 31 when coil 9 is in its lower or idle position to prevent upward movement thereof until contact with the latch has been removed. To this end, the relay latch in the form of a plate 32 is secured at one end to a bushing 33 rotatably mounted upon the pivot 25 of the ignition switch carrying plate 22 and is extended in an arcuate latch member 34 serrated on the under side over the free end of the relay arm 31, adapted under certain conditions to engage the end of the arm in the serrations and prevent upward movement of the coil 9. The stack safety mechanism illustrated is a commercial device constructed in accordance with this applicant's prior Patent No. 1,762,183, dated June 10, 1930, and includes the curved plate 35 eccentrically movable with the plate 4 between the stops 35a and 35b. The relay latch plate 32 is provided with an extension which mounts a pin 36 extending over the upper portion of the plate 35 and so arranged when the parts are in idle or cold position, as shown in Figure 2, the plate 35 will engage the pin 36 and support the latch 34 out of contact with the arm 31, but as the heat of combustion actuates the stack safety mechanism the plate 35 is dropped to engage the stop 35b, which is the normal running position, allowing the latch member 34 to rest upon the free end of the relay arm 31, as shown in Figure 3, so that as soon as the relay coil 9 drops, the end of the arm 31 is brought into engagement with the serrations on the under side of the latch 34 preventing upward movement of the coil 9 until the cooling of the combustion chamber returns the plate 35 to its cool position during which movement it engages the latch pin 36 and lifts the relay latch 34 to free the relay arm 31.

When the safety switch 7 has been opened by flame failure a manual reset is necessary and there are times when it is desired to shut down during the normal running of the burner when it is not convenient to do so by a manual operation of the thermostat. This invention contemplates a mounting for the safety switch, so that it may be manually released, opened and closed by such release means and at the same time preventing undue strain on the safety mechanism.

As shown in Figures 8 and 9, the safety switch 7 is mounted on a bracket 12 extending outward at right angles from the integral portion 12a mounted on the pivot 13. The switch carrying bracket terminates on a depending portion 12b parallel to the portion 12a and mounts a manual reset knurled knob 37 in alignment with the pivot 13. It is to be noted that the depending holding arm 17 is engaged by the pin 18 to hold the switch closed with the stop 14 on the plate 12a engaging the post 16. When the thermostatic strip 19 withdraws the pin 18 the weight of the switch 7 rotates its bracket until stop 15 thereon engages the post 16 and upon the cooling of the strip the pin 18 will engage the body of the arm 17 under tension of the strip 19, so that a clockwise rotation of the knob 37 will rotate the arm 17 out of engagement and allow the pin 18 to assume the position shown in Figure 8.

In order to effect a manual release of the switch 7 the pivot 13 of the bracket 12 is slidably mounted between the plates 20a and 20b and normally held in its normal position by a spring plate 38 mounted on the rear of the plate 20a, as shown in Figure 10, which allows the bracket when the knob 37 is depressed to slide back sufficiently to allow the arm 17 to be carried out of engagement with the pin 18 and upon a counterclockwise movement on the knob 37 to be rotated to open the switch. To prevent an attempted manual opening of the switch without first depressing the bracket from placing an undue strain on the contact of the pin 18 and arm 17, the knob 37 is pivotally mounted on the bracket portion 12b and a ratchet wheel 37a secured thereto adapted to be engaged by spring pawl 37b secured on the bracket adapted to slide over the ratchet wheel when a counterclockwise movement is imparted to the knob 37 but engage the knob and bracket to move together when a clockwise movement is imparted to the knob 37. When the bracket is depressed to free the arm 17, a counterclockwise movement on the knob opens the switch, the tension of the spring pawl 37b being sufficient to cause the knob and bracket to rotate together.

The control hereinbefore described, and claimed in the parent application, prevents admittance of fuel into the combustion chamber at each normal closing of the room thermostat until the ignition switch is in closed position. In the event of flame failure, it is sometimes desirable to make another attempt to establish or reestablish combustion before the burner mechanism is rendered inoperative until manually reset.

This applicant contemplates a slight addition to the control described which will accomplish this result, as shown in Figures 11 to 15, inclusive, and this structure forms the subject matter of this divisional application. To accomplish this, the ignition latch is of slightly different construction, in that that portion of the latch forming the weighted depending actuator arm 29 is bent back at right angles in the form of a bracket 40, as shown in Figure 14, to which is attached a bi-metallic plate 41 which extends in the opposite direction from the bracket terminating above the rectangular core 10 of the relay. This end supports an adjustable contact member 42 extending through the strip 41 in the direction of the ignition switch 21. The weight of the bracket 40 and the strip 41 normally causes the pawl 28 to engage the serrated portion 27 of the ignition switch carrying plate 22.

A vertical support plate 43 is mounted preferably in the laminations of the rectangular core 10 in a manner similar to the safety switch carrying plate P, preferably on the outer side of said plate P to clear the relay latch arm 31. This supporting plate 43 supports one end of a bi-metallic strip 44 which extends upward therefrom in the manner shown in Figures 11 and 12 to a position above and normally out of contact with the contact member 42 carried upon the ignition switch latch. A length of resistance wire 45 is wound about the bi-metallic strip 44 with the lower end connected to a binding post 46 on the support 43 and the upper end through the flexible lead 47 is connected to binding post 48 on the support 43.

An ignition release switch 49 is mounted upon the under side of the bracket 24 carrying the ignition switch in such a manner that said release switch 49 is caused to open and close with the ignition switch 21. Referring to the wiring diagram in Figure 15, it will be seen that the resistance wire 45 is connected in the secondary circuit between the room thermostat T and the heating element 20 of the safety switch 7 and the release switch 49 is also connected in series in the same manner and adapted when closed to shunt out the circuit passing through the resistance 45, and the shunt switch 5, when closed, shunts out both the resistance 45 and heat coil 20.

In the cold position with the control assuming a starting position, the relay switch 6 is open, the safety switch 7 is closed, the shunt switch 5 is open, the ignition switch 21 is closed and the release switch 49 is closed, so that when the room thermostat normally calls for heat by closing the secondary circuit, the current flows from the coil 9 through the room thermostat through the release switch 49 shunting out the resistance coil 45, and through the heating element 20 of the safety switch back to the coil 9. The energizing of the coil closes the relay switch 6, so that the incoming commercial current passes through the safety switch 7, part passing through primary coil 8 of the relay, and part through the relay switch 6 and motor M to the return commercial line, and switch 21 to the ignition device I, so that in the event the fuel is not ignited in a predetermined time, the safety switch 7 will be opened in the same manner as hereinbefore described. In the event combustion is established the stack safety mechanism will close the shunt switch 5, shunting out both resistance 45 and heating element 20 and allow the ignition switch to open in the same manner as hereinbefore described, and at the same time open the release switch 49. The ignition switch latch will through its pawl 28 lock the ignition switch in the open position, so that in the event of flame failure, the stack safety mechanism will cause the shunt switch 5 to open and inasmuch as the release switch 49 is locked in the open position, the secondary current will pass through the resistance 45 and heating element 20. The combined resistance of the wires 20 and 45 when both are connected in the secondary circuit is sufficient to cause the coil 9 to drop and break the circuit through the relay switch 6. However, the continued passage of the current causes the bi-metallic arm 44 to deform to disengage the ignition latch and allow the ignition switch to close before the safety switch 7 is opened, and as the ignition switch closes, the release switch 49 closes to shunt out the heating element 45, whereupon the resistance in the secondary circuit being reduced, the coil 9 will rise to close the relay switch 6 and if ignition occurs the parts will assume the position shown in Figure 11. If ignition does not occur within the predetermined time to close the shunt 5, the safety switch 7 will be opened in the same manner as hereinbefore described.

When the device has placed the equipment in operation and the demand for heat by the room thermostat has been fulfilled, or upon a current interruption, the opening of the secondary circuit and the subsequent deenergization of the relay to open the motor switch does not effect the release of the ignition switch carrier 22 to close the ignition and release switches with the cooling of the stack safety mechanism. The ignition switch 21 and release switch 49 when latched in open position are unable to close until released by the ignition latch 29 actuated by the deformation of the bi-metal arm 44. Therefore, when the shunt switch 5 has assumed the open position and the thermostat again calls for heat, operation of the burner without ignition is prevented as the combined resistance of the elements 20 and 45 prevent the passage of sufficient current to allow the secondary coil to close the relay switch 6. However, the bi-metal arm 44, upon the passage of the current through the resistance 45, is caused to deform to disengage the ignition latch and allow the ignition and release switches to close and thereafter the coil 9 will rise to close the relay switch 6 and effect a normal start of the burner.

What I claim is:

1. In combination with a motor operated fuel feeding means and an ignition means, a control system therefor including a burner motor circuit, a normally open motor switch in said circuit, a repulsion relay having a stationary primary coil connected in parallel with the motor circuit and a secondary floating coil connected in a secondary circuit with a room thermostat, the movement of said floating coil controlling actuation of said motor switch, means actuated by the closing of the room thermostat and floating of the secondary coil to close the motor switch, an ignition device connected in parallel with the motor circuit between the motor switch and motor, a pivotally mounted ignition switch in the ignition circuit, said ignition switch mounting having a serrated portion, a pivoted ignition switch latch having a pawl adapted to travel over said serrations as the switch opens and lock the switch against reverse movement and an actuating arm, a bi-metallic latch release arm normally out of contact with the actuating arm, but operable when heated to engage said arm and release said latch, a heat coil about said release arm in series with the secondary circuit, a shunt circuit about the latch release heat coil, a switch in said release shunt circuit, said release switch mounted upon the ignition switch mounting to close normally the release shunt circuit when the ignition switch is closed and to open the release shunt circuit when the ignition switch is opened, a device responsive to combustion conditions, including a carrier plate adapted to be rotated in one direction upon the establishment of combustion and thereafter rotated in the opposite direction upon the cessation of combustion, a normally closed thermally releasable safety switch in series with the primary coil and the motor circuit having an electric heating element connected in series with the release switch heat coil in the secondary circuit, a shunt circuit about said heating element and heat coil having a shunt switch therein, said carrier plate, when the device responsive to combustion conditions is cold, normally mounting the shunt switch to open the shunt circuit, means upon the ignition switch mounting adapted when said switch is closed to be engaged by the shunt switch and rotated to the open position when, upon establishment of combustion the carrier plate is rotated to close the shunt switch, said shunt switch being closed before the release switch is opened, whereby upon flame failure the device responsive to combustion conditions opens the shunt circuit to the safety switch heating element independently of the locked ignition switch and open release switch, whereby the resistance of the two heat coils reduces the current through the secondary coil causing it to fall and open the motor switch and thereafter the release switch heat coil causes the release arm to deform and release the pawl to disengage the ignition and release switch mounting to close the ignition and release switches before the safety switch is opened, whereupon the secondary coil is repelled to close the motor switch and if combustion occurs the burner will not be shut down, but in the event combustion does not occur, the safety switch opens the motor circuit.

2. The combination with a motor operated fuel feeding mechanism and ignition means, a control therefor including a motor switch, an ignition switch, a temperature responsive mechanism operable when heated by the combustion of the fuel to open the ignition switch, means normally locking the ignition switch when opened, a normally closed releasable safety switch, a thermal release for said switch, a thermal release for the ignition switch locking means and individual electrically actuated heating elements for each of said releases, a repulsion relay adapted when energized to close the motor switch, having a secondary circuit including therein the two electrical heating elements, the combined electrical resistance of said elements being sufficient to prevent the operation of the relay when said secondary circuit is energized, a shunt switch for shunting the ignition switch thermal release element operatively connected with the ignition switch to move therewith to open the shunt circuit with the opening of the ignition circuit and a second shunt switch for shunting both thermal release elements, adapted to be closed before the opening of the release shunt switch by the combustion mechanism when operating to open the ignition switch, whereby upon energization of the relay the secondary circuit is established through the first shunt switch to close the motor switch and the closing of the second shunt switch renders the ignition switch locking means operative and prevents the release of the said safety switch.

3. In combination with a motor operated fuel feeding mechanism and ignition means, a control system therefor including a motor circuit, a normally open motor switch in said circuit, a relay for closing the motor switch in said motor circuit, a secondary circuit for controlling the operation of said relay and including therein a room thermostat, an ignition device connected in parallel with the motor circuit, a normally closed ignition switch in the ignition circuit, a temperature responsive mechanism operable when heated by the combustion of the fuel to open the ignition switch, means normally locking the ignition switch when opened by said temperature responsive means, a thermal release for the locking means, an electrically operated heater therefor in the relay secondary circuit and an electrical resistance element in series therewith, the combined resistances of heater and element being such as to prevent sufficient energization of the relay to close the motor switch upon establishment of the secondary circuit, a shunt circuit about said electrical heater, a normally closed release switch in the shunt circuit operatively connected with the ignition switch to move therewith to open the shunt circuit with the opening of the ignition circuit whereby upon subsequent energization of the secondary circuit the thermal release releases the locking means to permit the ignition and release switches to close when the combustion responsive means attains its normal cold position, a second shunt circuit about both resistances including a switch normally open and adapted to be closed by the combustion responsive mechanism upon the establishment of combustion before the release switch is opened.

4. The structure of claim 3 wherein the ignition switch and release switch are mounted upon a pivoted carrier plate having a serrated arcuate portion and the locking means includes a pivoted pawl mounted to engage normally between the teeth of said portion.

5. The structure of claim 3 wherein said thermal release includes a strip of thermal metal wound with electrical resistance wire operating when heated by the establishment of the circuit therethrough to deform the strip to release the locking means.

6. The structure of claim 3 wherein the ignition switch and release switch are mounted upon a pivoted carrier plate having a serrated arcuate portion and the locking means includes a pivoted pawl mounted to engage normally between the teeth of said portion, and wherein said thermal release includes a strip of thermal metal wound with electrical resistance wire operating when heated by the establishment of the circuit therethrough to deform the strip to engage the pawl to release the locking means.

IRA E. McCABE.